United States Patent

Lüpertz

[11] 4,279,331
[45] Jul. 21, 1981

[54] FLOATING-CALIPER DISC BRAKE

[75] Inventor: Hans-Henning Lüpertz, Darmstadt, Fed. Rep. of Germany

[73] Assignee: ITT Industries, Inc., New York, N.Y.

[21] Appl. No.: 87,262

[22] Filed: Oct. 22, 1979

Related U.S. Application Data

[63] Continuation of Ser. No. 6,945, Jan. 25, 1979, abandoned.

[30] Foreign Application Priority Data

Feb. 6, 1978 [DE] Fed. Rep. of Germany ....... 2804977

[51] Int. Cl.³ .......................................... F16D 55/224
[52] U.S. Cl. ................................. 188/73.3; 188/71.8; 188/73.5
[58] Field of Search .................. 188/71.1, 71.8, 72.4, 188/72.5, 73.1, 73.3, 73.4, 72.3, 73.5

[56] References Cited

U.S. PATENT DOCUMENTS

| | | | |
|---|---|---|---|
| 3,166,159 | 1/1965 | Burnett | 188/73.3 |
| 3,392,808 | 7/1968 | Soltis, Jr. | 188/72.4 X |
| 3,406,792 | 10/1968 | Kennel | 188/72.4 |
| 3,410,371 | 11/1968 | Burnett | 188/71.8 |
| 3,616,877 | 11/1971 | Collins | 188/73.3 |
| 3,628,639 | 12/1971 | Daley, Jr. | 188/73.3 |

FOREIGN PATENT DOCUMENTS

| | | | |
|---|---|---|---|
| 2510036 | 9/1975 | Fed. Rep. of Germany | 188/73.3 |
| 2284800 | 4/1976 | France | 188/73.3 |

*Primary Examiner*—George E. A. Halvosa
*Attorney, Agent, or Firm*—John T. O'Halloran; Alfred C. Hill

[57] ABSTRACT

A floating-caliper disc brake having a brake carrier with two radially extending arms embracing the bridge portion of the brake caliper and a pair of guide pins which are resiliently supported at both ends by the caliper. The middle portion of the guide pins slidably engage cylindrical cups which are secured to the brake carrier arms. The brake is easy to manufacture and provides good caliper alignment.

12 Claims, 2 Drawing Figures

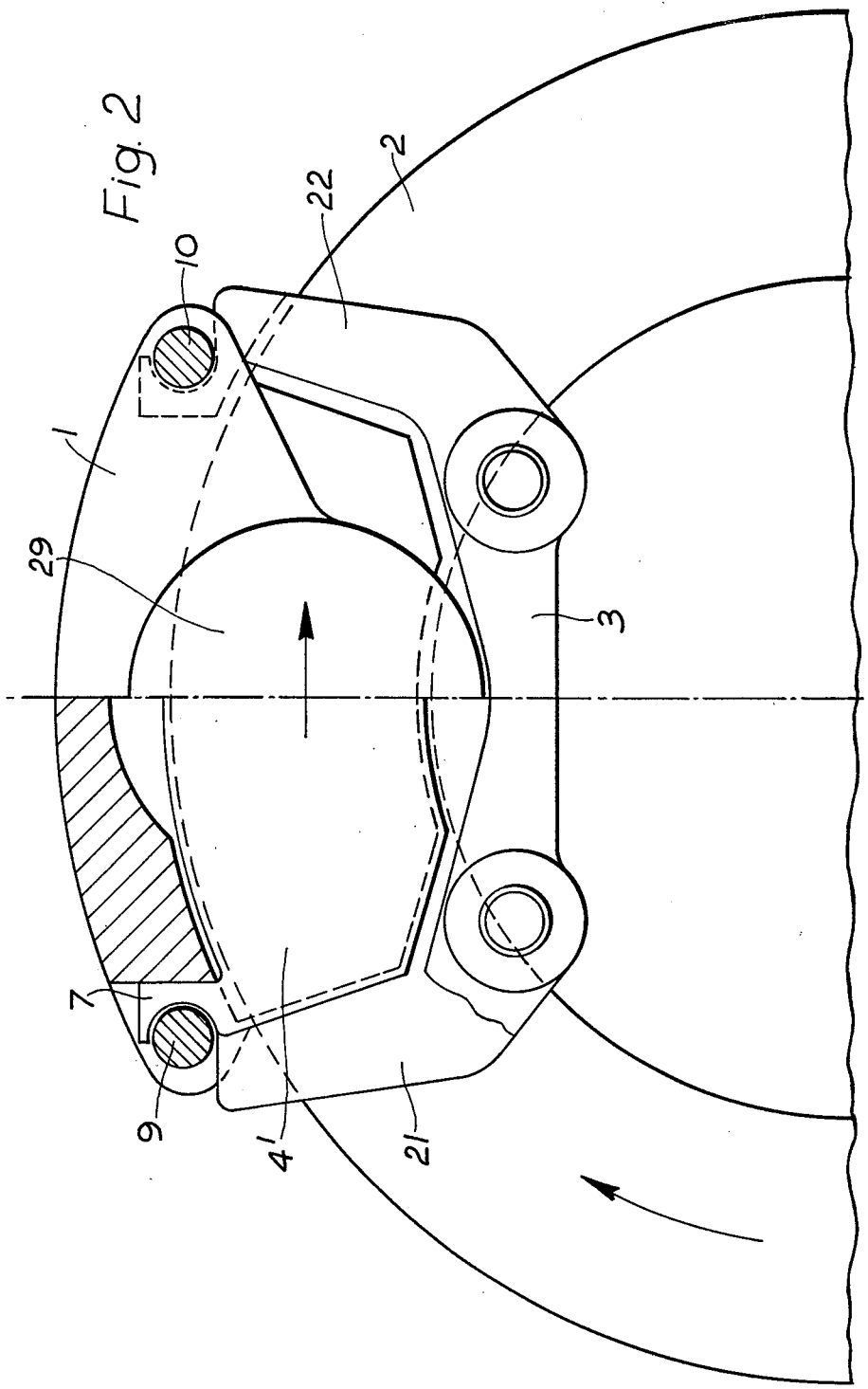

FLOATING-CALIPER DISC BRAKE

CROSS-REFERENCE TO RELATED APPLICATIONS

This is a continuation of application Ser. No. 6,945, filed Jan. 25, 1979, now abandoned.

BACKGROUND OF THE INVENTION

This invention relates to a floating-caliper disc brake, in particular for automotive vehicles, having a brake caliper straddling the edge of a brake disc, which is axially and slidably guided on arms of a brake carrier by means of spaced guide pins arranged parallel to the rotational axis of the brake disc and which is adapted to be supported on confronting supporting surfaces of the arms in the direction of rotation of the brake disc, and with brake shoes arranged on both sides of the brake disc and supported on the brake caliper in the direction of rotation of the brake disc, the brake shoes being actuated by a brake-actuating device arranged on one side of the brake disc.

In a known floating-caliper disc brake of the type referred to above as disclosed in U.S. Pat. No. 3,789,961, the brake caliper bears solely upon the supporting surfaces of the arms of the brake carrier in the direction of brake-disc rotation. The disadvantage of this arrangement is that on brake actuation the whole circumferential force transferred from both brake shoes to the brake caliper is transmitted to the rear arm of the brake carrier when viewed in the direction of brake-disc rotation, while the other arm of the brake carrier receives practically no load at all. Therefore both brake-carrier arms must be so dimensioned that they provide sufficient strength to receive the whole amount of circumferential force. Since in this known arrangement of the brakes, the brake caliper adjusts its position to the position of the supporting surface against which it abuts, the elastic deformation of the brake-carrier arm under the impact of the circumferential force causes misalignment of the brake caliper in relation to the brake disc and consequently wedge-shaped tangential wear on the brake shoe friction material. This effect is undesirable because it does not allow full use of the thickness of the friction material.

From British Pat. No. 1,194,567 a floating-caliper disc brake is known in which spaced guide pins are secured in the brake caliper when viewed in the direction of rotation of the brake disc, with sleeves being fitted onto the pins for axial sliding movement thereon and engaging into cups of a plate-shaped brake carrier aligned parallel to the brake disc, the cups being turned away from each other and outwardly open. The brake carrier includes a centric opening in which a brake shoe is guided and supported. A second brake shoe disposed on the opposite side of the brake disc is secured to the brake caliper. In this floating-caliper disc brake, the torque of the two brake shoes is transmitted to separate members of the brake carrier. The brake shoe which directly bears upon the brake carrier transmits its circumferential force to the rear area of the brake carrier when viewed in the direction of brake-disc rotation. The circumferential force of the brake shoe secured to the brake caliper, however, is transmitted to the brake carrier via the brake caliper and the front guide pin when viewed in the direction of brake-disc rotation. This arrangement results in an improved distribution of the load to the brake carrier. A disadvantage of this known floating-caliper disc brake is, however, the low alignment effect of the guiding of the brake caliper which may be the cause of substantial wedge-shaped wear of the brake shoe friction material. Further, the unilateral introduction of a circumferential force into the brake caliper by the brake shoe secured to the brake caliper makes it necessary to counteract the tendency of the caliper to turn about a radial axis by providing an offset of the two brake shoes in the peripheral direction. The counterforce produced by such an offset arrangement of the brake shoes must, however, be taken up by the brake disc, thereby causing an additional bearing pressure to be exerted on the brake disc.

SUMMARY OF THE INVENTION

It is an object of the present invention to provide a floating-caliper disc brake of the type initially referred to which avoids the disadvantages of the above described known floating-caliper disc brakes and provides an advantageous distribution of the circumferential forces produced during braking to the arms of the brake carrier.

A feature of the present invention is the provision of a floating-caliper disc brake comprising: a brake carrier having a pair of spaced arms extending over the edge of a brake disc; a brake caliper straddling the edge of the disc and supported by confronting supporting surfaces on the pair of spaced arms in the direction of rotation of the disc; a cylindrical cup secured to each of the pair of spaced arms, each of the cups opening outwardly in a peripheral direction relative to the disc; a pair of brake shoes supported by the caliper, one of the pair of brake shoes being disposed on one side of the disc and the other of the pair of brake shoes being disposed on the other side of the disc; a brake-actuating device carried by the caliper on the one side of the disc to actuate the pair of brake shoes; and a pair of spaced guide pins secured to the caliper parallel to the rotational axis of the disc, each of the pair of spaced guide pins slidably engaging a different one of the cups to axially and slidably guide the caliper relative to the carrier.

In the brake according to the present invention, part of the circumferential force taken by the brake caliper is transferred to the front arm of the brake carrier, when viewed in the direction of brake-disc rotation, while the other part of the circumferential force is transferred to the rear arm of the brake carrier, when viewed in the direction of brake-disc rotation, by the abutting engagement of the brake caliper with the brake carrier supporting surfaces. Since the elastic properties of the two arms of the brake carrier are essentially identical, there results, with the usual manufacturing tolerances, an essentially even distribution of the circumferential forces to the two arms of the brake carrier. Since both arms of the brake carrier are available to take up the circumferential forces, a relatively high stiffness of the brake in the direction of load application is obtained and the occurrence of brake shudder and squeal is counteracted. Another essential advantage of the floating-caliper disc brake constructed in accordance with the present invention is that the deformations of the brake-carrier arms under load do not lead to a misalignment of the brake caliper.

In an advantageous embodiment of the brake of this invention, the guide pins are preferably secured to the brake caliper resiliently in the peripheral direction, engaging the cups in the brake carrier under prestress.

This arrangement provides an elastic clamping effect of the brake caliper relative to the brake carrier, preventing rattling of the brake caliper in its guides and improving the alignment of the caliper in the direction of the axis of the cylindrical cups.

To avoid the occurrence of jamming forces and reduce corrodibility, it is further proposed to have the diameter of the cylindrical cups slightly larger than the diameter of the guide pins.

In a preferred embodiment of the floating-caliper disc brake of the present invention, the brake caliper includes, in an axial direction on both sides of the arms of the brake carrier, bores to receive the guide pins and whose diameter is greater than the diameter of the guide pins by the amount of necessary clearance of motion of the caliper relative to the brake carrier; and resilient means are provided centering the guide pins in the bores of the brake caliper. This arrangement substantially simplifies the manufacture of the brake of the present invention, because the distance between the bores accommodating the guide pins and the distance between the cups on the arms of the brake carrier does not necessitate above average precision-manufacture. In accordance with another feature of the present invention, the resilient means are preferably provided by rubber rings held in annular grooves in the guide pins which engage the bores in the brake caliper under radial prestress.

A release movement of the brake caliper after actuation of the brake can be achieved in an advantageous and straightforward manner by providing for axially limited movement of the guide pins relative to the brake carrier by an amount corresponding to the necessary brake clearance, and by a spring urging the guide pins against a stop on the brake caliper in the direction of brake release. In a particularly simple embodiment of such a clearance arrangement for the brake caliper, the present invention provides a stop head for each guide pin on its end adjacent the brake-actuating device, the guide pins carrying a respective rubber ring between the stop head and the brake caliper, which rubber ring projects into the chamfered end section of the bore and is adapted to be compressed on brake actuation to such an extent that the stop head abuts against the brake caliper after the guide pin has covered a distance corresponding to the necessary brake clearance.

According to another feature of the present invention, the application of load on the guiding arrangement of the brake caliper by a torque caused by the circumferential force is avoided by arranging the supporting surfaces and the cups in the middle above the outer periphery of the brake disc. A further advantage is achieved if the cup and the supporting surface, which are turned towards the main direction of rotation of the brake disc, thereby receiving the circumferential forces when the brake is applied in the main direction of brake-disc rotation, are of convex configuration. This configuration provides, in the event of deformation of the arms of the brake carrier under the impact of the circumferential force, no notable displacement of the points of contact between brake carrier and brake caliper and guide pins, respectively, occurs. Therefore, the deformation of the arms of the brake carrier cannot produce a torque on the brake caliper.

Further, the floating-caliper disc brake of the present invention affords a simple structure by providing the brake shoes, which bear directly against the brake caliper in the direction of brake-disc rotation, with recesses in which the guide pins are engaged.

Moreover, the floating-caliper disc brake may be improved advantageously by having the brake shoes bear directly against the brake caliper in a radial direction, with the guide pins holding them in the opposite direction. In such a design of the brake, the bores in the brake caliper, the cups in the arms of the brake carrier and the recesses in the brake shoes are preferably brought into line such that the guide pins, which are resiliently held in the bores, provide for mutual clamping of the brake carrier, the brake caliper and the brake shoes. In such a design of the brake of the present invention, the resilient fastening of the guide pins serves to prevent rattling of all relatively movable brake components.

Further advantages of the brake of the present invention are in particular that the brake consists of a small number of individual components which allow individual manufacture and ease of assembly. Moreover, the brake of the present invention is suitable for use in vehicles in which the brake carriers are manufactured integrally with the wheel suspension of the vehicle.

BRIEF DESCRIPTION OF THE DRAWING

Above-mentioned and other features and objects of this invention will become more apparent by reference to the following description taken in conjunction with the accompanying drawing, in which:

FIG. 2 is a view, partially in section, of the floating-caliper disc brake of FIG. 1 in the direction of the brake-disc axis.

DESCRIPTION OF THE PREFERRED EMBODIMENT

Figure 1:
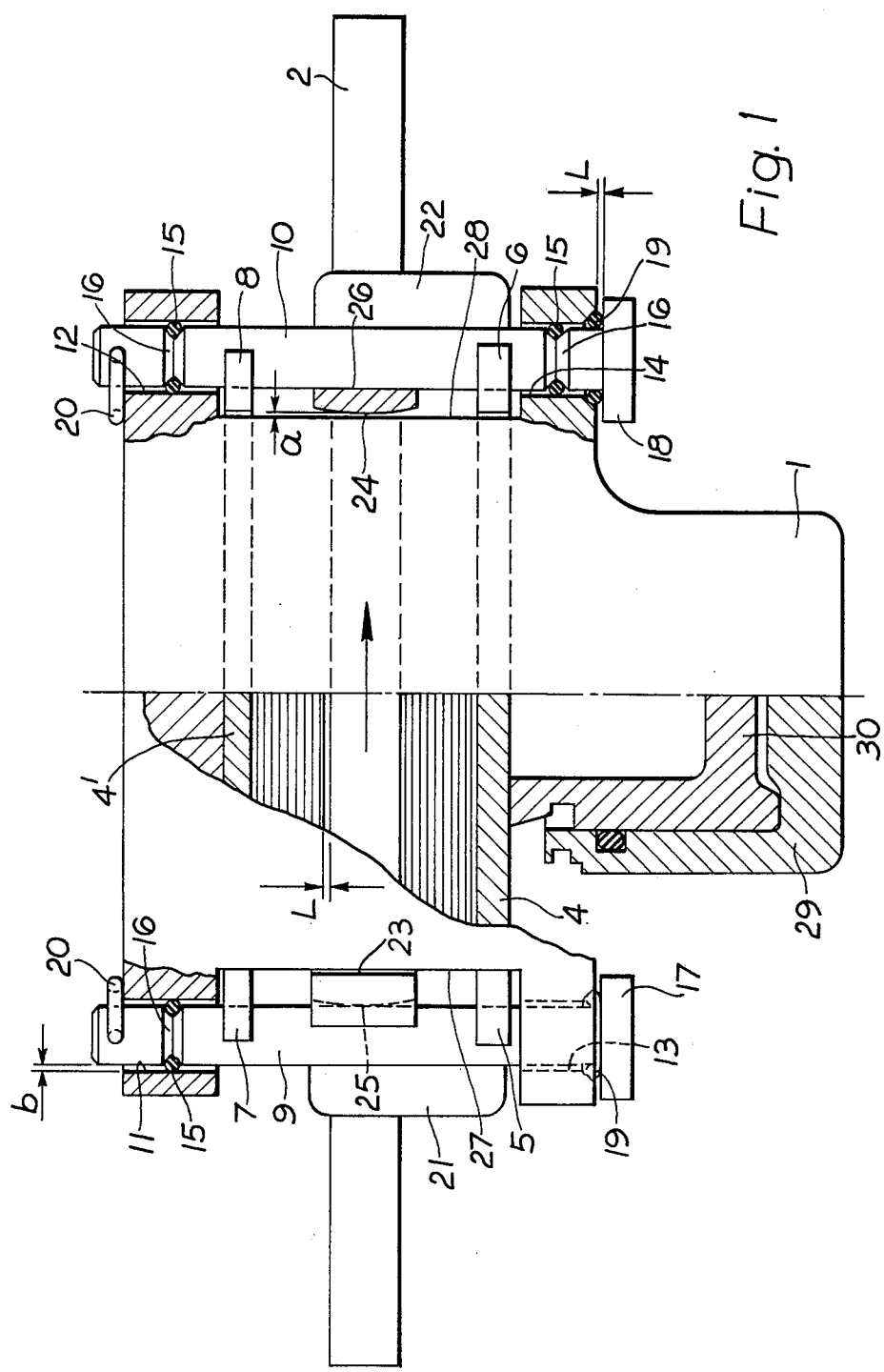
FIG. 1 is a top plan view, partially in section, of a floating-caliper disc brake in accordance with the principles of the present invention.

The embodiment illustrated in FIGS. 1 and 2 includes a brake caliper 1 straddling the outer edge of a brake disc 2 in a U-shaped manner and brake shoes 4 and 4' disposed on both sides of brake disc 2. Brake shoes 4 and 4' have essentially the shape of a circular disc segment, embracing with radially outwardly directed projections 5, 6, 7 and 8 the central portion of brake caliper 1. On the side turned away from brake caliper 1, projections 5, 6, 7 and 8 include recesses for engagement with guide pins 9 and 10 fixed to brake caliper 1, in order to hold brake shoes 4 and 4' in their position relative to the brake caliper 1.

At its ends pointing in the peripheral direction, brake caliper 1 has projections including bores 11, 12, 13 and 14 receiving guide pins 9 and 10. To hold the guide pins in the bores 11 to 14, rubber rings 15 are used which are inserted into annular grooves 16 provided in guide pins 9 and 10. In the direction of their longitudinal axis, guide pins 9 and 10 are held by stop heads 17 and 18 bearing against brake caliper 1 through rubber rings 19, and by fastening elements 20 disposed at opposite ends of guide pins 9 and 10. In this arrangement, fastening elements 20 hold guide pins 9 and 10 in such a position that stop heads 17 and 18 and brake caliper 1 are spaced an amount corresponding to the necessary brake clearance L.

The brake carrier 3 has radially outwardly extending arms 21 and 22 projecting beyond the edge of brake disc 2 and having ends with confronting supporting surfaces 23 and 24 lying centrally above brake disc 2, and cylindrical cups 25 and 26 having concave openings turned away from each other and located in a common plane disposed perpendicular to and substantially above said disc. A clearance "a" is provided between supporting surfaces 23 and 24 and the neighboring surfaces 27 and 28 of brake caliper 1. Guide pins 9 and 10 abut against cylindrical cups 25 and 26. In this arrangement, the distance between cup 25 and cup 26 is slightly larger than the distance between bores 11 and 13 and bores 12 and 14 so that rubber rings 15 are slightly compressed, resulting in a clearance "b" between guide pins 9 and 10 and bores 11, 12, 13 and 14.

For brake actuation, brake caliper 1 has a wheel brake cylinder 29 with an actuating piston 30.

When the brake is applied, brake-actuating piston 30 is first displaced, moving brake shoe 4 into engagement with brake disc 2. As soon as brake shoe 4 is in abutment with brake disc 2, the reaction force effective at wheel brake cylinder 29 displaces brake caliper 1 in the opposite direction until the clearance L between brake disc 2 and brake shoe 4' is overcome and brake shoe 4' is in abutment with brake disc 2. At the same time, rubber rings 19 are compressed and urged into bores 13 and 14 so that stop heads 17 and 18 abut against brake caliper 1. If brake disc 2 is rotating in the direction indicated by the arrow, the circumferential force generated at brake shoes 4 and 4' as a result of the frictional engagement is transferred to brake caliper 1 via the projections 5 and 7 which abut against surface 27. Under the action of the circumferential force, brake caliper 1 is displaced in the direction of the arrow until clearance "b" in bores 11 and 13 is used up and the circumferential force can be transmitted to arm 21 of brake carrier 3 through guide pin 9 and cup 25. If clearance "a" equals clearance "b", also surface 28 of brake caliper 1 abuts against supporting surface 24 of arm 22 of brake carrier 3, so that part of the circumferential force can also be taken by arm 22. With identical clearances "a" and "b", the distribution of the circumferential force to the two arms 21 and 22 depends essentially on their elasticity. Since both arms are of the same design, the distribution of the circumferential force should be relatively even.

Conditioned by manufacturing tolerances, the case may, however, be that clearances "a" and "b" are different. Where possible, the tolerances should be chosen such that clearance "b" is not greater than clearance "a" because this favors the alignment of brake caliper 1 when it moves into abutment with brake disc 2. If clearance "a" is greater than clearance "b", surface 28 of brake caliper 1 will be in abutment with supporting surface 24 only after an elastic deformation of arm 21 and guide pin 9 has occurred. In that case, arm 21 will take a larger portion of the circumferential force than arm 22 which is, however, no great disadvantage because the application of a higher load on arm 21 lying on the disc entry side favors the alignment of brake caliper 1 under the action of the circumferential force.

If wear of the friction lining occurs at brake shoe 4' during braking, guide pins 9 and 10 in cups 25 and 26 will be displaced because stop heads 17 and 18 are already in abutment with brake caliper 1. After release of the brakes, rubber rings 19 reassume their original form, causing return of brake caliper 1 and brake shoe 4' by the amount of brake clearance L. The clearance of brake shoe 4 is caused by the roll-back effect of the ring seal in wheel cylinder 29.

I claim:
1. A floating-caliper disc brake comprising:
   a brake carrier having a pair of spaced arms extending above the edge of a brake disc having an axis of rotation;
   a brake caliper straddling the edge of said disc having a pair of spaced first supporting surfaces parallel to said axis of rotation, each of said pair of first supporting surfaces being associated with a different one of said pair of spaced arms above the edge of said disc;
   a cylindrical cup secured to each of said pair of spaced arms centrally above said disc, each of said cups having a second supporting surface parallel to an associated one of said pair of first supporting surfaces to support said caliper in the direction of rotation of said disc and a concave opening opposite said second supporting surface having a longitudinal dimension parallel to said second supporting surface, said concave openings being opened outwardly away from each other in a common plane disposed perpendicular to and substantially above said disc;
   a pair of brake shoes each bearing directly against said caliper, one of said pair of brake shoes being disposed on one side of said disc and the other of said pair of brake shoes being disposed on the other side of said disc;
   a brake-actuating device carried by said caliper on said one side of said disc to actuate said pair of brake shoes; and
   a pair of spaced guide pins secured to said caliper parallel to said axis of rotation, each of said pair of spaced guide pins slidably engaging said concave opening of a different one of said cups to axially and slidably guide said caliper relative to said carrier, to hold said pair of brake shoes against said caliper and to clamp said pair of first supporting surfaces, said second supporting surfaces and said pair of brake shoes relative to each other so that circumferential forces developed during braking at said pair of brake shoes are distributed to both of said pair of spaced arms through said pair of first supporting surfaces, said second supporting surface, said pair of guide pins and said concave openings.
2. A brake according to claim 1, wherein
   each of said pair of spaced guide pins are resiliently secured to said caliper and engage the associated one of said concave openings under prestress.
3. A brake according to claim 2, wherein
   the diameter of said concave openings is slightly larger than the diameter of said pair of spaced guide pins.
4. A brake according to claim 3, wherein
   said caliper includes
   bores on opposite sides of said pair of spaced arms to receive the ends of each of said pair of spaced guide pins, the diameter of said bores being greater than the diameter of said pair of spaced guide pins, and
   first resilient means disposed in each of said bores to center an associated end of said pair of spaced guide pins therein.
5. A brake according to claim 4, wherein
   each of said first resilient means includes
   a rubber ring held in an annular groove disposed in an associated end of said pair of spaced guide pins and engaging an associated one of said bores under radial prestress.

6. A brake according to claim 4, wherein
each of said pair of spaced guide pins are capable of limited axial movement relative to said caliper by an amount corresponding to a necessary brake clearance, and
further including
a second resilient means associated with each of said pair of spaced guide pins to urge each of said pair of spaced guide pins in the direction of brake release.

7. A brake according to claim 6, wherein
each of said pair of spaced guide pins includes
a stop head on an end thereof adjacent said brake-actuating device; and
each of said second resilient means includes
a rubber ring encircling an associated one of said pair of spaced guide pins between an associated one of said stop heads and said caliper, said rubber ring, upon brake actuation, projecting into a chamfered end section of an associated one of said bores and compressed to such an extent that said associated one of said stop heads abuts against said caliper after the associated one of said pair of spaced guide pins has moved a distance corresponding to said necessary brake clearance.

8. A brake according to claim 6, wherein
one of said second supporting surfaces directed toward the main direction of rotation of said disc is of convex configuration.

9. A brake according to claim 6, wherein
each of said pair of brake shoes includes
a pair of projections bearing directly against said caliper in the direction of rotation of said disc, each of said pair of projections having a recess engaging an associated one of said pair of spaced guide pins.

10. A brake according to claim 9, wherein
said bores, said concave openings and said recesses are aligned such that said pair of spaced guide pins provide for mutual clamping of said carrier, said caliper and said pair of brake shoes.

11. A brake according to claim 6, wherein
the distance between said bores associated with one of said pair of spaced guide pins and said bores associated with the other of said pair of spaced guide pins is equal to or smaller than the distance between said concave openings.

12. A brake according to claim 11, wherein
the clearance existing between said second supporting surfaces and said pair of first supporting surfaces is equal to or smaller than the clearance existing between said guide pins and said bores in an unbraked state of said brake.

* * * * *